Feb. 25, 1930.                L. R. HESTON ET AL                    1,748,767
                              ELECTRIC BENCH SHAPER
                              Filed June 23, 1928
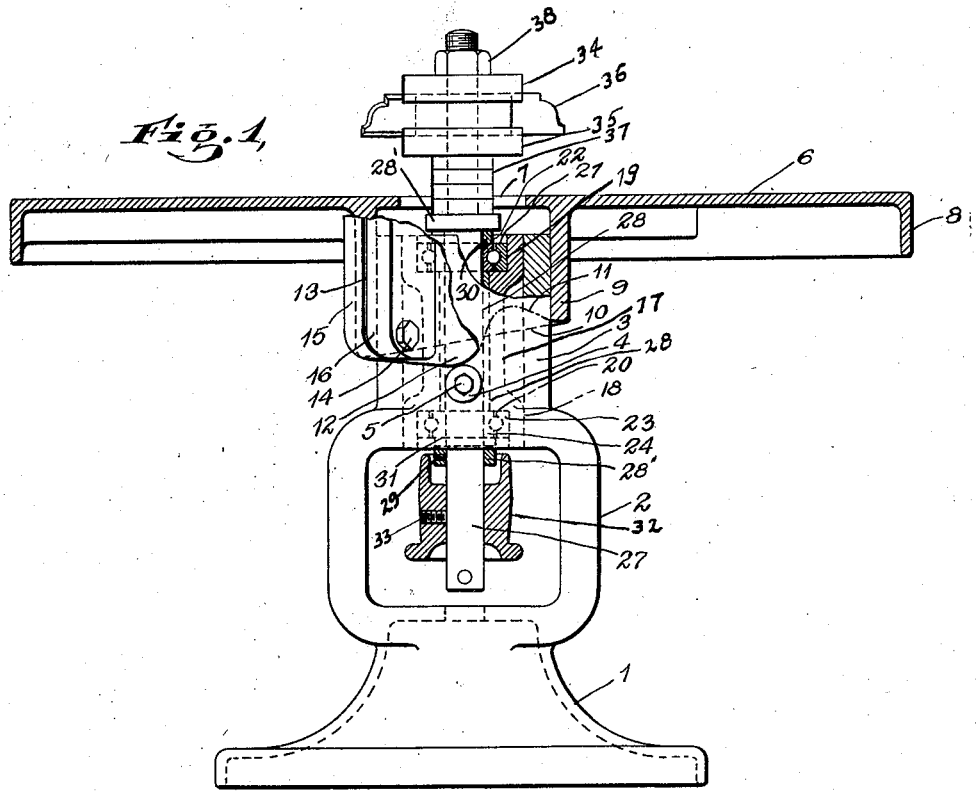
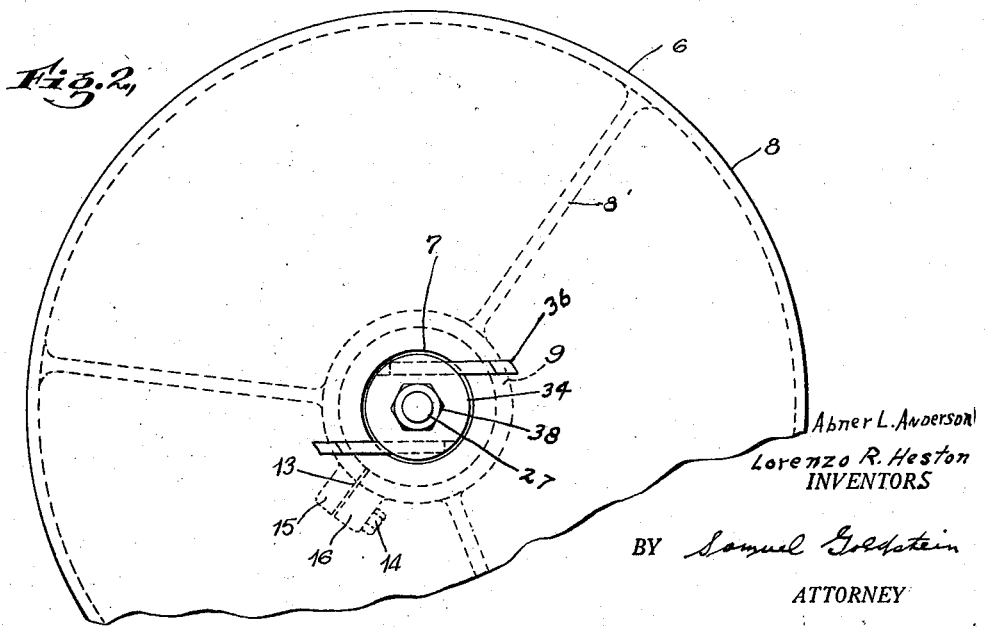
Abner L. Anderson
Lorenzo R. Heston
INVENTORS
BY Samuel Goldstein
ATTORNEY Patented Feb. 25, 1930

1,748,767

UNITED STATES PATENT OFFICE

LORENZO R. HESTON AND ABNER L. ANDERSON, OF FAIRFIELD, IOWA

ELECTRIC BENCH SHAPER

Application filed June 23, 1928. Serial No. 287,817.

This invention relates to the improvements in bench shapers, and one of the objects is to elevate the table with relation to the moulding cutter knives mounted on the rotating spindle, to properly locate the latter with reference to the work, such as mouldings on the edges of table tops and similar articles of furniture.

Another important object is to permit a ready detachment of the bearing assembly from the machine to provide suitable adjustments to be made and the necessary oiling of the parts when the occasion warrants.

Referring to the drawing, Fig. 1 is a part elevational and sectional view of the machine.

Fig. 2 is a plan view of a part of the machine.

The numeral 1 represents the base of the machine, and integrally associated therewith is a hollowed part designated by 2 and the latter carries a hollow post or standard represented by 3. A roller 4 is mounted on the post and is secured thereto by means of a set screw 5 which extends thru a screw threaded opening in the wall of the post. Any stop or projection can also be used. 6 designates a table, which has a central aperture 7, a marginal flange 8, strengthening ribs 8' and a central hub or flange 9 which slidably and rotatably engages the cylindrical post or standard 3. As a means for producing a longitudinal or axial movement of the hub or flange and a consequent elevation and depression of the table when the latter is manually rotated, the hub 9 is provided with a cam or inclined surface 10 along a major portion thereof, and this inclined surface terminates with a surface which is curved along different radii as shown by numerals 11, 12. This inclined and curved surface contacts the roller and produces an elevation and depression of the table when it is rotated.

In order to clamp the table in any desired position of adjustment, the wall of the hub is split as designated by the numeral 13, and it is clamped in position by the intermediary of a clamping screw 14 which extends thru the plates 15, 16, integrally connected with the hub at the split portion thereof.

The bearing housing is represented by the numeral 17, and this housing is secured in position within the post and hollowed portion 18 of part 2 by means of the set screw 5 which holds it in position. This housing has the seats 19 and 20 at its upper and lower portions and positioned within the seats are the collars, 21, 22, 23, 24 which hold the ball bearings 25, 26, which revolve in the raceways.

Mounted to rotate in the bearing is the spindle 27 which is inserted thru the bushing or sleeve 28 positioned within the bearing housing and the spindle is provded with a stop flange in spaced relation, the former being shrunk on the spindle, and the latter being detachably secured by means of the set screw 29. Spacing collars 30, 31, are also provided and space the flange and stop collar from the ball bearings and the respective members 28' and 28" prevent displacement of the spindle with respect to the ball bearings.

The spindle is driven by any suitable motor or motive means, which drives the belt trained about the pulley 32 detachably and adjustably secured on the extremity thereof, by the intermediary of a set screw 33.

Slidably engaging the spindle are the spaced holding plates 34 and 35 which hold the moulding cutter knives positioned in grooves within the plates and the nut is provided for clamping and holding the knives in secured and rigid position as the latter are rotated and bear upon the work set upon the table. A plurality of filler collars designated by numeral 37 may also be provided.

It will be apparent that various shaped knives can be used in conjunction with different clamping or holding plates as the particular work will necessitate. All that is necessary is to remove the plates from the spindle and replace them with a different group of plates with any particular cutting tool, the assemblage being secured rigidly in position by means of the nut.

It will also be apparent that any substitutes can be used for the roller such as stops or projections on the post on which the hub or flange may normally rest and act as co-operating means for elevating or depressing the table. The bearing housing may also be attached and detached by separate set screw.

When the motive power is supplied to the pulley, the spindle 27 revolves and the revolving moulding cutter knives are directed against the article of furniture or moulding placed or positioned on the table. During the cutting operation, the work may be placed in correct cutting position with respect to the cutter knives by simply rotating the table clockwise or counter-clockwise and this movement will be translated into a longitudinal movement or axial movement of the hub 9 and a consequent elevation and depression of the table with respect to the spindle and cutter knives mounted thereon, due to the cam action of the inclined face or surface of the hub on the contacting roller. The clamping screw 14 which was released to permit the movement can now be tightened and the table will stay clamped in any particular position required for the proper cutting operation.

Whenever it is desired to oil or adjust any part of the bearing assembly which includes the bearing housing, spindle, collars, ball bearings, bushing, pulley, all that is necessary is to release the set screw 5 and the entire bearing assembly can be bodily removed thru the central aperture 7. The proper adjustments of the pulley, collars, spindle, bushings, ball bearings can now be readily facilitated and the various parts oiled and cleaned and if necessary replacements made, and when this has been accomplished the entire assembly can be inserted thru the central aperture 7 and very readily and conveniently secured in position by tightening the set-screw 5 and the assembly secured in appropriate position.

It will be apparent from the above description that an efficient bench shaper has been provided, which can be operated by any suitable motive power, which can be very easily adjusted and oiled, due to the simplicity of its construction, and can be easily adjusted by elevating and depressing the table with respect to the spindle and cutter knives which have a relative stationary position with respect to the mechanism.

We claim:

1. In a bench shaper, a frame having an upwardly extending hollow post, a table having a hub rotatably and slidably mounted on said post, a bearing housing mounted within said post, a roller mounted on the exterior of the latter, means for detachably securing the bearing housing and roller to the post, a spindle rotatably mounted within the bearing housing, means associated with the spindle for preventing longitudinal displacement of the latter with respect to the bearing housing, a pulley detachably mounted on said spindle, and said hub having a cam surface in contact with said roller.

2. In a bench shaper, a base having an upwardly extending hollow post, a table having a hub rotatably and slidably mounted on said post, a bearing housing mounted on the interior of said post, a roller mounted on the exterior thereof, means for detachably securing the bearing housing and roller to the post, a spindle rotatably mounted in the bearing housing, said hub having a helical surface in contact with the roller.

3. In a bench shaper, a base having an upwardly extending hollow post, a table having a split hub rotatably and slidably mounted on said post, a bearing housing mounted on the interior of said post, a roller mounted on the exterior thereof, means for detachably securing the bearing housing and roller to the post, a spindle rotatably mounted in the bearing housing, said hub having a cam surface in contact with the roller, said cam surface comprising a major helical part and a minor double curved part, said hub having opposed offset members at the split portions and means extending thru the members for clamping the hub and table in adjusted position.

4. In a bench shaper, a base having an upwardly extending post, a table having a hub rotatably and slidably mounted on said post, a roller mounted on the latter, said hub having a helical surface in contact with the roller to cause longitudinal sliding movement of the former along the axis of the post upon manual rotation of the table.

5. In a bench shaper, a base having an upwardly extending hollow post, a table having a hub rotatably and slidably mounted on said post, a bearing housing mounted on the interior of said post, a stop mounted on the exterior thereof, means for detachably securing the bearing housing to the post, a spindle rotatably mounted in the bearing housing, said hub having a helical surface in contact with said stop to permit elevation and depression of said table along the axis of said post, upon manual rotation thereof.

LORENZO R. HESTON.
ABNER L. ANDERSON.